J. M. W. KITCHEN.
METHOD OF UTILIZING FUEL WASTES.
APPLICATION FILED APR. 3, 1909.
1,094,390.
Patented Apr. 21, 1914.
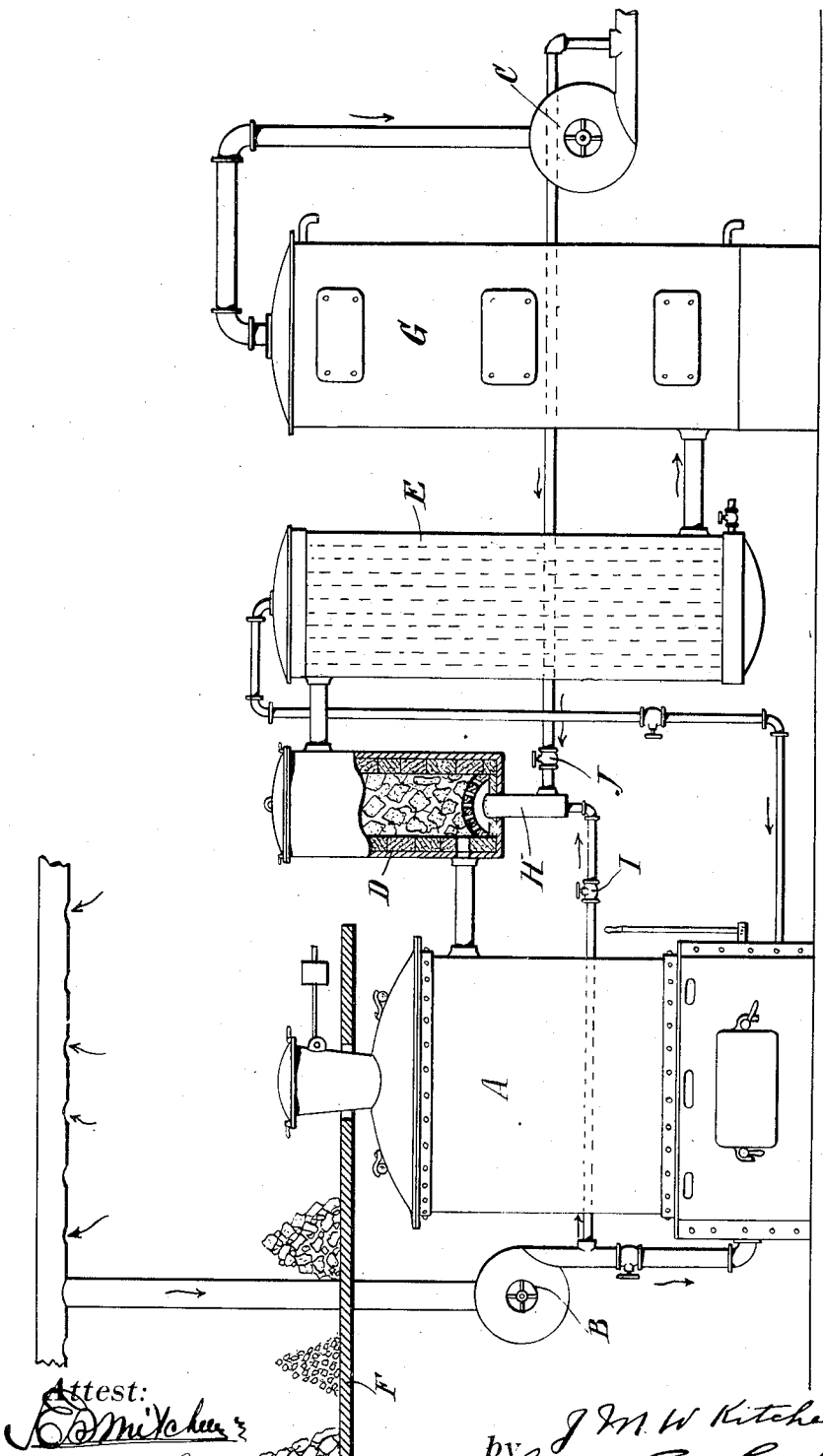

UNITED STATES PATENT OFFICE.

JOSEPH MOSES WARD KITCHEN, OF EAST ORANGE, NEW JERSEY.

METHOD OF UTILIZING FUEL WASTES.

1,094,390.  Specification of Letters Patent.  Patented Apr. 21, 1914.

Application filed April 3, 1909. Serial No. 487,694.

*To all whom it may concern:*

Be it known that I, JOSEPH MOSES WARD KITCHEN, a citizen of the United States, residing in the city of East Orange, county of Essex, State of New Jersey, have invented new and useful Improvements in Method of Utilizing Fuel Wastes, of which the following is a specification.

The objects of this invention are to utilize low cost fuels and fuel wastes in the making of a very cheap fuel gas of satisfactory quality for power generation and other uses; and to increase the adaptability of fuels, ordinarily difficult to handle, to a more extended use in the production of a fuel gas which can be used for metallurgical, domestic and other purposes, as well as for power generation. The fuels referred to, are those which, when in mass, are too compact to allow for the passage of a desirable flow of gases through the mass between the fuel particles. Such fuels are represented by anthracite fine dust, those of so hard a character that they can be only gasified under a very high heat, such as coke and cinders, and also those which require the addition of auxiliary burnable matters to secure their burning, such as garbage.

Usually as a basis for my methods I secure a porous, somewhat hard carbonaceous substance, such as anthracite cinders, coke or carbonized garbage, and gasify such substance in a producer gas generator, either with or without admixture of other fuel substances, such as anthracite fine dust, coke breeze, bituminous slack, or lignite. In some cases I also use a certain proportion of fine ashes intermixed with a porous fuel.

There is an enormous aggregate quantity of unburned carbon thrown away in ashes. Sometimes as much as ten to fifty per cent. of the bulk of ashes is burnable carbon. There are also large amounts of fine coal dusts discarded in ordinary coal mining processes; and there are enormously large deposits of low grade fuels that at present are not usually considered as being desirable to use.

My object is to indicate a practical method for using such fuel wastes and unused fuels, which method is varied to meet special conditions. The general idea involved, is to reclaim a waste porous fuel of a somewhat hard texture, such as anthracite cinders, or coke from which a considerable amount of the more volatile constituents of the fuel has been driven by high heat; and to gasify such fuels under special degrees of pressure in an internally fired gas producer, and preferably, with an admixture of as much fine fuel dusts containing a considerable amount of easily volatilized constitutents, as it is practical to use. Such fine fuel dusts alone usually cannot be used in making producer gas because of the impervious character of such fuels when in mass, which prevents the passage of air through the mass and tends to pass air between the periphery of the fuel mass and the walls of the producer, which misdirected passage results in the formation of carbon dioxid instead of the carbon monoxid that is desired in producing gas. Furthermore, if air is forced through fuel masses of such compact texture, gas ducts are formed therein and much dust is drawn or forced out of the producer through those ducts. I overcome this difficulty in handling fuel dusts by admixing a certain amount of fine coal dusts with the porous fuel used, as for example in the following proportions:—viz: anthracite cinders two parts, and fine anthracite dust one part. I find that the best results are secured by using both forced and induction drafts in the producer.

The inventive ideas involved in the invention, are subject to wide variations, in practice, as I apply the principle of preparing fuels in various ways and in many admixtures of fuels, in order to secure a better physical character in the fuel mass to use in the producer. Wherever anthracite cinders are obtainable, they afford an economical and satisfactory basis for my fuel mixtures. In many cases, gas house coke is used as the porous ingredient of the admixtures; while in still other cases I admix hard coals and soft coals, and even use coke breeze, which is a hard product, with bituminous and semi-bituminous coal, and thus secure the burning of what would otherwise be a waste. Garbage may also be used with other fuels in securing a satisfactory condition for combustion. In fact there is a long list of carbonaceous substances that may be utilized to advantage by mixing them in proper proportions with other substances and then gasifying the admixtures under suitable mechanically produced pressures; and usually, under both properly regulated mechanically forced and induced pressures.

In cleaning the gas from tar and dust, I adopt any one of several methods. In using ordinary anthracite fuel, I find that a simple combination water heater and condenser will remove the tar vapor, as well as furnish water vapor for the gas making. When there is much tar in the gas generated, as is usually the case when gas house coke admixed with bituminous slack, is used, I pass the gas through a super-heater filled with refractory heat retaining material, and which is heated by a blast of gas and air under forced pressure, and under a retained and repressed pressure in the super-heater. This pressure is obtained by regulating the size of the particles of the refractory filling in the super-heater, or by contraction in size of the outlet of the heater. I preferably use pre-heated air and gas for heating the super-heater. The heating may be accomplished in one heater, or two may be used intermittently and alternately; and this is the preferable way when a rich gas is desired.

When I use reclaimed cinders in my method the process of reclaiming the cinders may vary, and is usually performed through the use of mechanically operated methods of sifting, which separates the finer ashes from the cinders, and eliminates the coarser matters that would be foreign to a use in the producer. It is better in sifting, to arrange for securing a relatively uniform size of the cylinders reclaimed. I make specially produced coke for use in my method or may use more or less dried garbage or other organic matter. In some cases I admix very hard unburned fuel, with a fuel volatilizing at a lower temperature than the hard fuel. In either of these cases the hard fuel passes through the producer, burning more slowly than the other fuel, and forms a supporting structure for the fine dust or the other more easily burnable admixed fuel which is burned or volatilized at a higher level above the grate or fuel table supporting the fuel bed.

Various types of producers may be used in carrying out my methods, but I prefer to use the type illustrated in my Patent 1,008,274, issued November 7th, 1911.

The accompanying elevational drawing which is partly in section and partly broken away, illustrates diagramatically some of the means with which I carry out my methods; screens for screening, retorts for coking, and admixing mechanisms being omitted as being unnecessary for understanding the invention.

The reference characters indicate as follows:—

A is a producer which may be of any suitable type.

B is an exhauster and blower which draws air from a high level and which has been heated by heat radiated from the elements of the plant illustrated, and forces the air into the producer and to the burner H.

C is an exhauster for the gas generated.

D is a super-heater for fixing tarry and other vapors in the gas.

E is a gas cooler, water heater and condenser.

F is a fuel admixing and charging floor.

G is a scrubber.

H is a burner.

I is an air valve.

J is a gas valve.

The porous cinders or coke, and other fuel if such is to be used, are brought to the charging floor and fed into the producer A, which is run at a somewhat high heat along with the use of water vapor from the gas cooler E in amounts proportionate to the rate of combustion carried on in the producer. The gas after being cleaned from tar and dust may be stored for use, or conveyed directly for use in a gas engine, or forced to other places in which it is to be used. In case the gas is to be used in a furnace, or has not much tar vapor in it, the process of super-heating the gas is omitted. The admixture of the fine fuel with a more porous fuel which has been already subjected to high heat, and which generally requires an unusual high heat to gasify, acts as an obstacle to a too free passage of gases through the fuel mass, and thus enables a high heat to be given to the fuel mass. In certain cases, with a moderate depth of cinders in the producer, it has been found difficult to generate gas from the cinders alone, but if a certain proportion of ashes is left in or admixed with the cinders, a physical texture is given to the admixed fuel mass which allows the admixed cinders and ashes to be then gasified, producing a burnable but rather lean gas, which however can be burned under compression, such as is practised in an internal combustion engine especially designed for using lean gases. Gases of this character can also be advantageously and easily enriched by oils, as well as by admixtures of richer fuels.

In referring to fuel wastes in this application, it is to be understood that besides meaning coke and anthracite cinders, I also mean other fuels some of which are not well suited for producer gas generation or for steam generation while in their natural condition. The amount of fuel in sight that is naturally of a character to be convenient and satisfactory to use for power generating purposes, is limited. Fuel oils exist in especially limited amounts. Even anthracite coal does not exist in unlimited amounts; but there are large deposits of soft coals which can be made useful by the methods I herein describe and claim, and which can thus be reclaimed and used as a serviceable fuel through the improved method of admixture with prepared porous, or naturally hard fuels.

It should be understood that in this invention the addition of fine dust to such materials as coke and cinders, not only helps to enrich the gas made, but it also helps to retard the too quick passage of gases through the fuel mass when under mechanically produced air pressures. This performance helps to increase the heat in the fuel mass and to secure the highest heat at the lowest level of the fuel mass in the producer gas generator. This result is a desideratum, inasmuch as partly volatilized fuels require unusual high heat to gasify, and because gases from such fuels are of a poorer quality because of their contained nitrogen and carbon-dioxid gases. I have found that fine ashes may, in case of need, be sometimes used in place of unburned fine fuel. Fine ashes always contain some unburned carbon, and its mechanical effect makes it possible to produce through its co-active use, a gas sufficiently rich to burn under atmospheric pressure. It is substantially impractical to produce a gas of such richness without some such admixture. Such thin poor gases, however, can be burned under special conditions of pressure, and especially if unnecessary admixtures of amounts of air with the gas be avoided. If the gas is used in an internal combustion engine, the pressure and amount of air required in its burning are easily controlled. In all cases, I deliver such gas under controlled pressure to the place of its burning. In the drawing, I show the means B for compressing and forcing the air, and the means C for assisting the forced pressure used in delivering the gas. But under most conditions in which I wish to burn such thin gas under atmospheric pressure, I prefer to enrich the gas to a greater or lesser extent; a convenient apparatus for which performance is shown in my co-pending application, Serial No. 662,667, filed April 22nd, 1911.

It will be understood that the present method specially relates to the preparing of such fuels as soft bituminous and lignite coals, and also exceptionally hard anthracite fuels, which under old time conditions I consider as fuel wastes, as well as reclaimed cinders and gas house coke, for the purpose of making fuel gases to be used in power generation and for other purposes.

It will be obvious that the nature of the gas made would have to be in accordance with the use for which it is intended.

What I claim as new is:

1. The method of utilizing fuel wastes herein described, which consists in, (1) reclaiming fuel from which volatilizable constituents have been driven by heat, whereby the fuel is rendered more porous and relatively free from easily volatilizable constituents, (2) admixing fine dust like fuel of impermeable character when in mass with the reclaimed fuel, whereby the fine dust like fuel when is mass is rendered more permeable to the passage of gases between its particles and throughout the admixed mass, and (3) gasifying the admixed fuels in a producer gas generator.

2. The method of utilizing fuel wastes herein described, which consists in, (1) reclaiming a burnable carbonaceous waste that has been rendered porous by heat, (2) admixing with said porous waste another carbonaceous waste of a dense physical character both as to density of the particles composing the said other waste and as to density of the said other carbonaceous waste as a mass, whereby the second named waste acquires a sufficient porosity when in mass to allow of a uniformly diffused permeation of and passage of gases through the mass of the admixed wastes, (3) generating a burnable gas from the admixed wastes in a gas generator by passing air through the admixed fuels and completely burning part of the admixed fuels, and (4) delivering the burnable gas generated to a place outside of the gas generator in an unburned condition.

3. The method of utilizing fuel wastes herein described, which consists in, (1) intimately admixing fuel particles from which heat has driven easily volatilizable constituents such as tar, sulfur and hydrogen, and which have thus been rendered porous, with fuel particles that have not been subjected to artificial high heat and which contain easily volatilizable constituents and which when in mass is only imperfectly permeable to gases, and (2) generating a combustible gas from the admixed fuels under a controlled mechanically produced forced air pressure and a mechanically produced induced gas pressure.

4. The method of utilizing fuel wastes herein described, which consists in, (1) preparing a fuel by driving sulfur and tar from the fuel and admixing fine dust like fuel with the prepared fuel, whereby the admixed fuels when in mass are better suited for gasification in an internally fired gas generator, (2) generating a combustible gas from the admixed prepared fuel and fine dust like fuel under a mechanically produced pneumatic pressure greater than atmospheric pressure, and (3) delivering the gas in an unburned condition for purposes of combustion.

5. The method of utilizing fuel wastes, herein described, which consists in, (1) admixing a porous carbonaceous fuel waste which has been freed from tarry and other volatile matters, with a fine dust like fuel which is of a compact and gas impermeable character when in mass, (2) gasifying the admixed fuels under a controlled mechanically produced pneumatic pressure, and (3) super-heating the gas to fix condensable vapors in the gas.

6. The method of utilizing fuel wastes, herein described, which consists in, (1) screening unburned fuel from ashes, sorting the screened, unburned fuel into a mass of particles of a substantially uniform and moderate size and sorting slag and other non-combustible admixed matters from the fuel particles, (2) adding to and admixing with the fuel particles a desired proportion of ashes, whereby gases are prevented from passing too quickly through the screened unburned fuel and higher heat is retained in the fuel mass when under a process of gasification, (3) generating a combustible gas from the unconsumed fuel particles and ashes in an internally fired gas generator under a mechanically produced controlled air pressure higher than atmospheric pressure, and (4) delivering the gas outside of the generator in an unburned condition.

JOSEPH MOSES WARD KITCHEN.

Witnesses:
ELIZABETH B. KING,
GEO. S. WHEELOCK.

Copies of this patent may be obtained for five cents each, by addressing the "Commissioner of Patents, Washington, D. C."